March 3, 1970   E. K. KAUCHER ETAL   3,498,777
GLASS-WORKING LATHE

Filed Nov. 18, 1966   5 Sheets-Sheet 1

INVENTOR.
ERWIN K. KAUCHER &
RICHARD H. WEINGRAD
BY
ATTORNEY

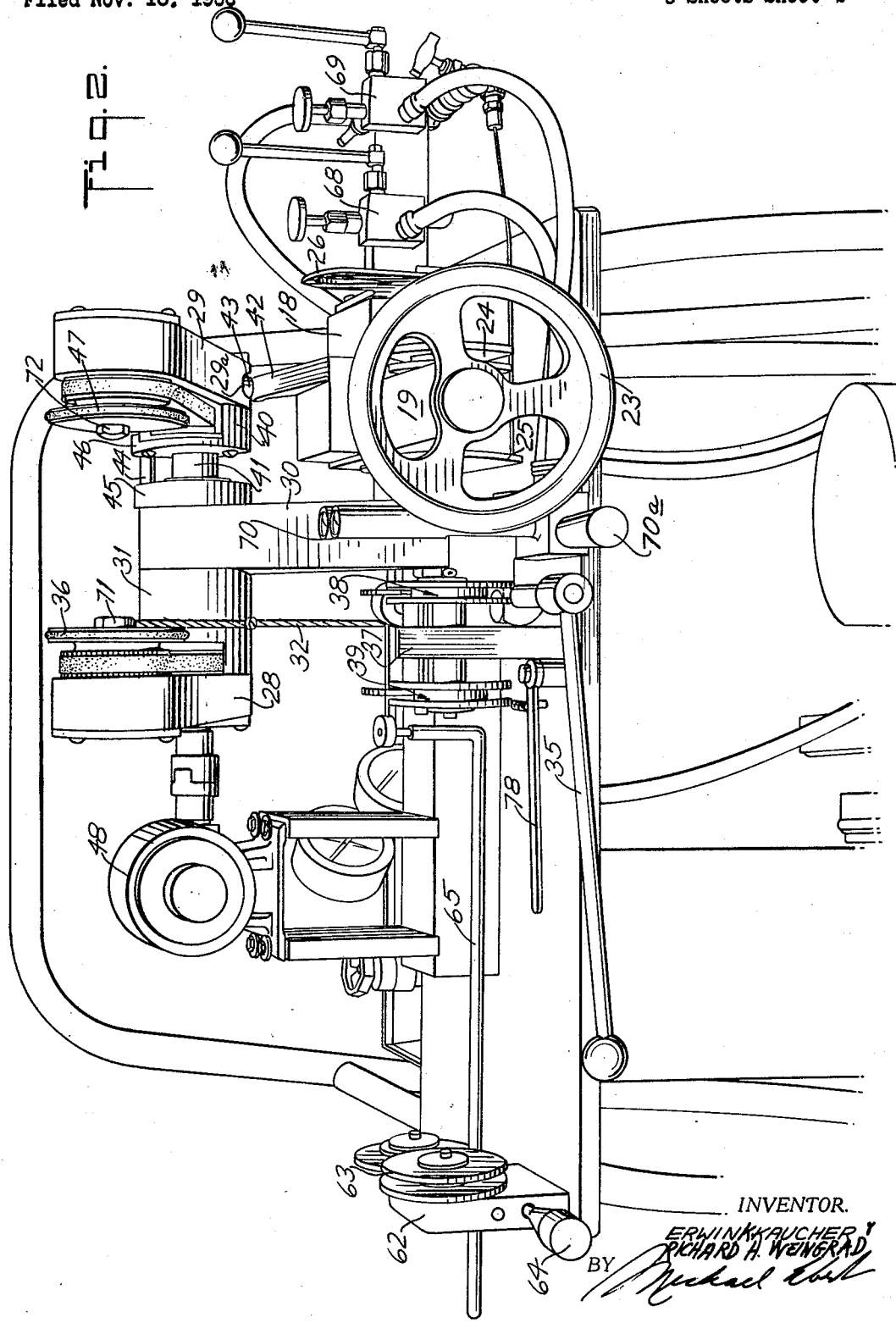

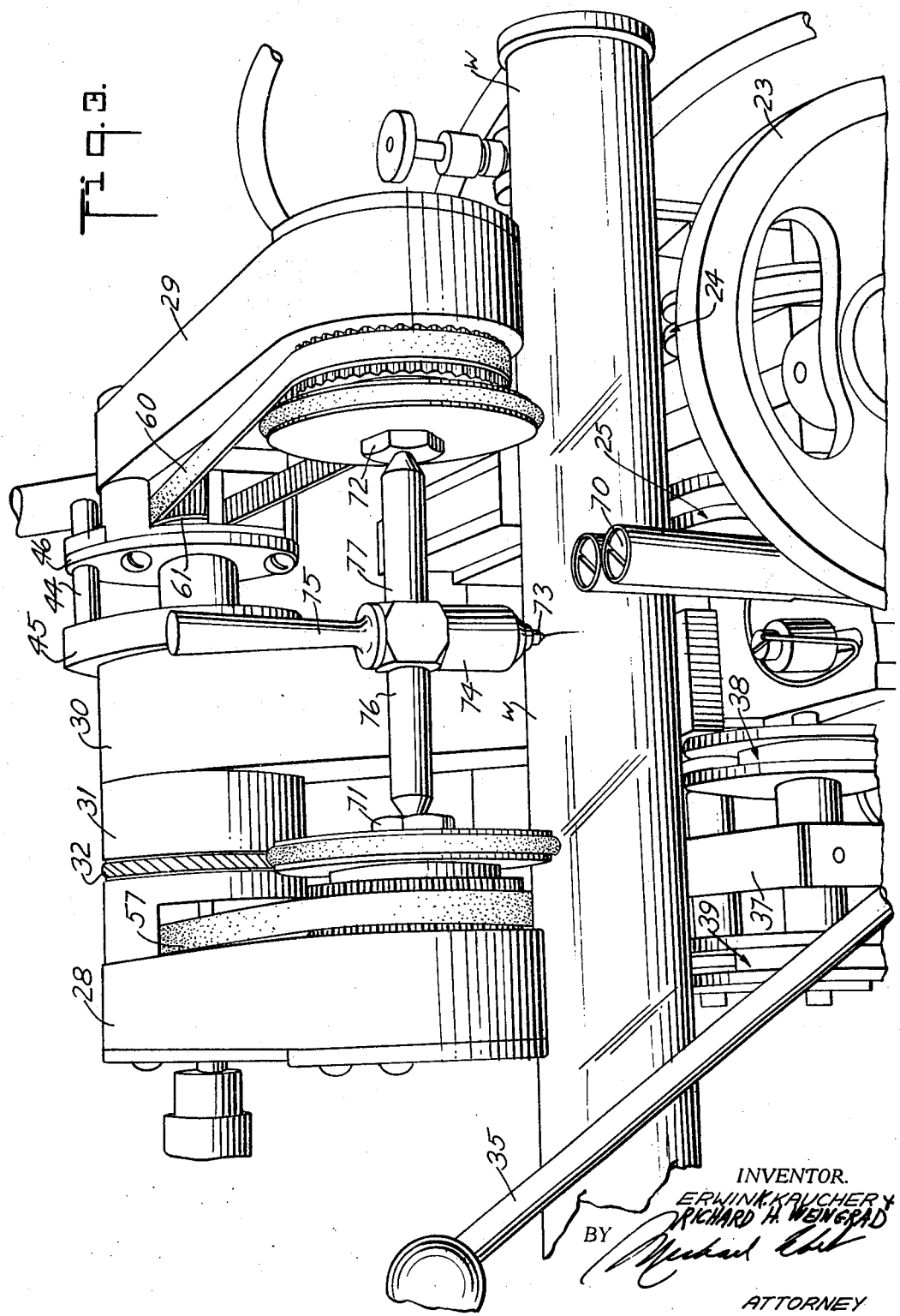

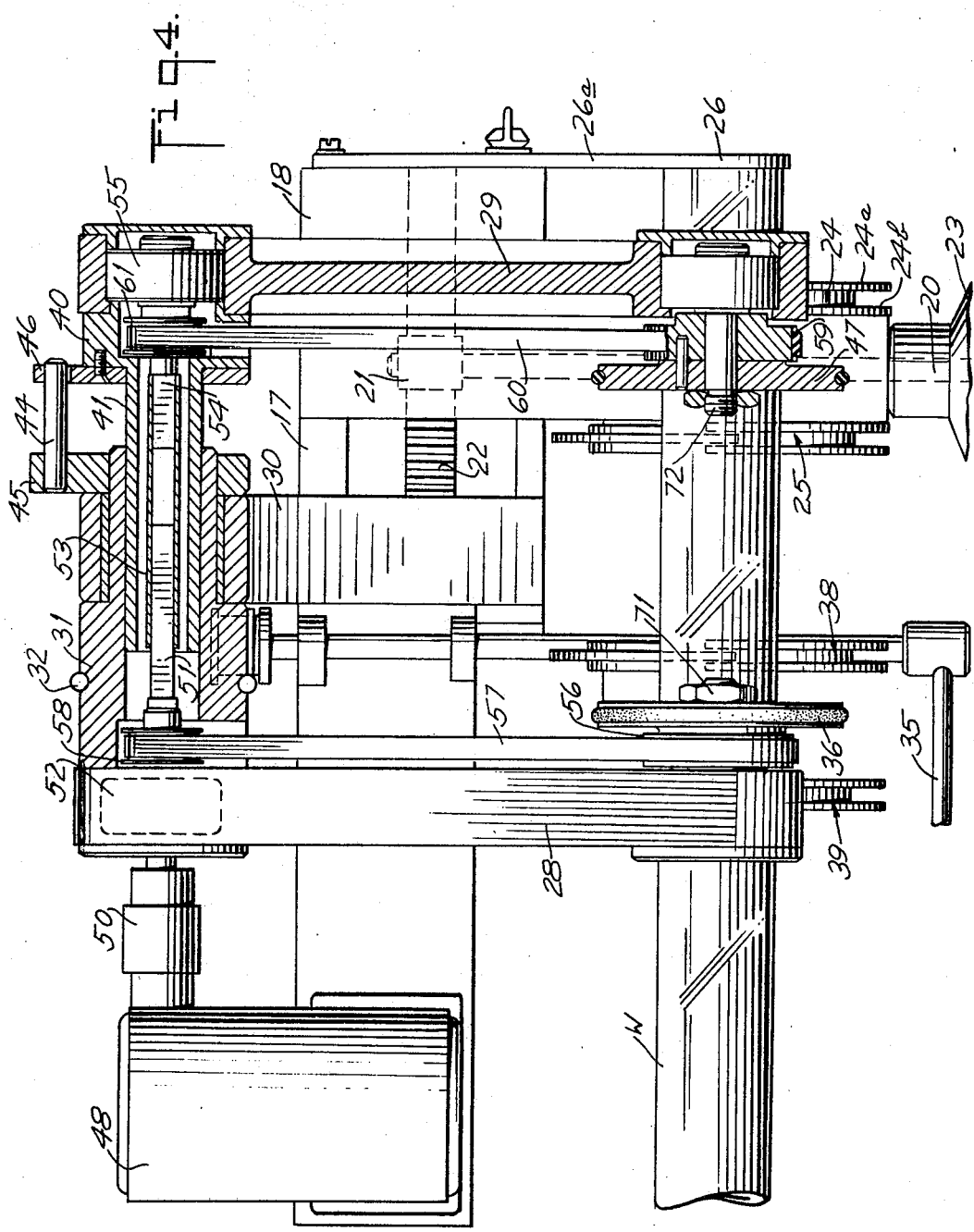

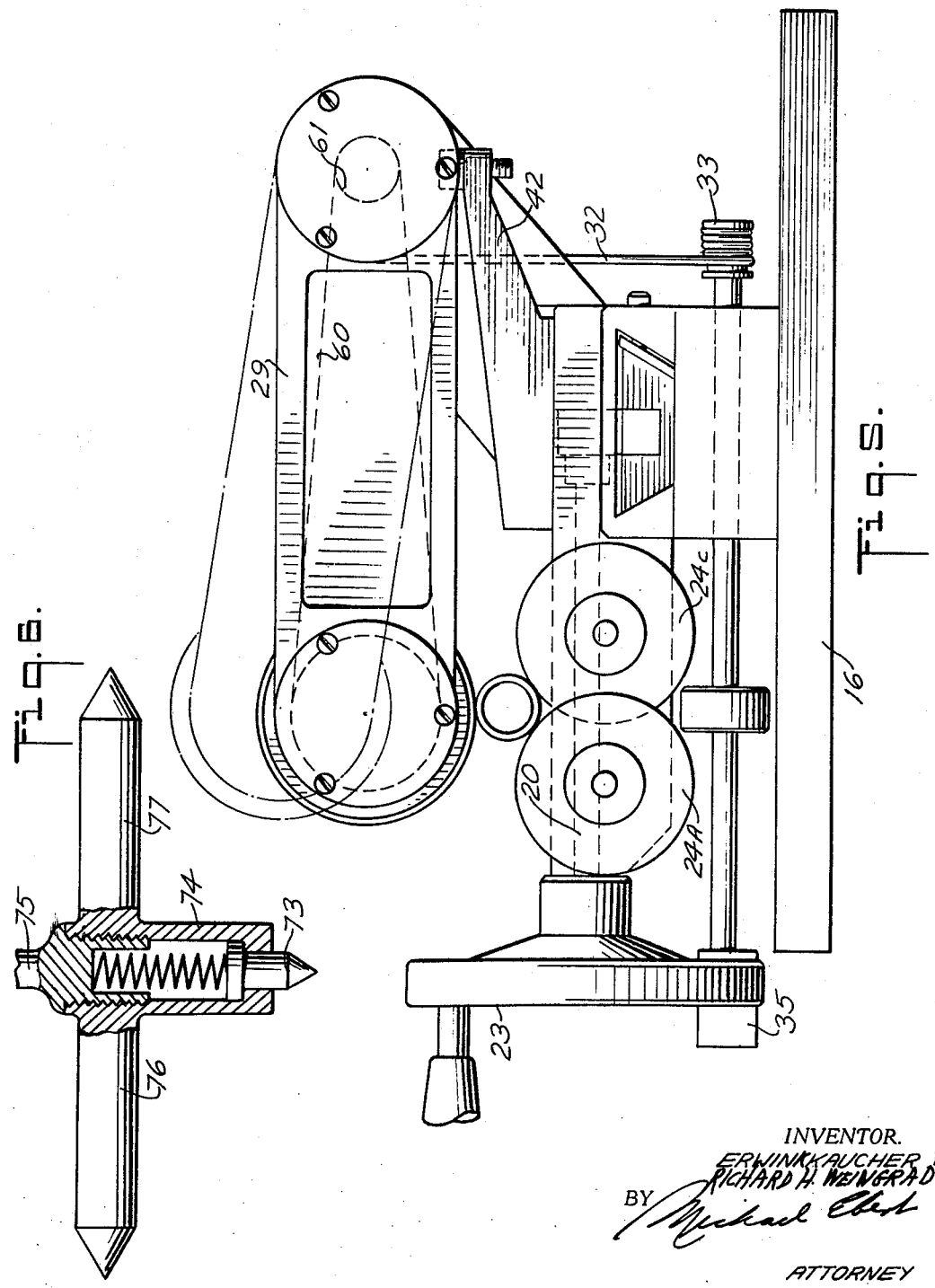

United States Patent Office 3,498,777
Patented Mar. 3, 1970

3,498,777
GLASS-WORKING LATHE
Erwin K. Kaucher, Souderton, and Richard H. Weingrad, Ambler, Pa., assignors to Fischer & Porter Co., Warminster, Pa., a corporation of Pennsylvania
Filed Nov. 18, 1966, Ser. No. 595,451
Int. Cl. C03b 33/06
U.S. Cl. 65—176                                6 Claims

ABSTRACT OF THE DISCLOSURE

A glass-working lathe in which a carriage, shiftable along ways on a bedplate, is linked to a pivotally-supported arm on whose end a first drive wheel is rotatably mounted. When the arm is brought down from an elevated position, it causes the first drive wheel to engage the surface of a tubular workpiece resting within a V-shaped recess defined by a first set of idler rollers supported by a cantilever beam extending from the carriage, whereby movement of the carriage causes a corresponding shift both in the position of the first drive wheel and the first set of idler rollers. The carriage is movable along the ways with respect to a second pivotally-supported arm on whose end a second drive wheel is rotatably mounted, the two arms being operatively linked for simultaneous pivotal movement, and being provided with means to rotate the two wheels concurrently. When the second arm is brought down, it engages the surface of the workpiece resting within a V-shaped recess defined by a second set of idler rollers mounted at a fixed position above the bedplate, whereby the workpiece is clamped and is caused to rotate between the sets of idler rollers and the two drive wheels.

---

This invention relates generally to glass-working apparatus, and more particularly to an easily-operated glass-working lathe for the field fabrication of glass pipes, tubing, and drain lines.

Widespread use is now made of glass tubing or piping in building construction as well as in various manufacturing facilities. With the advent of glass materials, such as borosilicate glass, having high corrosion-resistance and an ability to withstand high temperature gradients and high pressures, increasing use is now made of such piping in the chemical industry. Moreover, glass tubes and pipes lend themselves readily to complex arrangements, so that their flexibility of assembly also contributes to the growing popularity of these conduits. In addition, the structural integrity of borosilicate glass products is such that one can expect the glass installation to last the lifetime of the building with relatively little maintenance.

Ordinarily, the installation of glass process pipe entails highly skilled glass blowers or toolers to cut and form the conical ends of the piping to special lengths and to otherwise fabricate the pipe to meet specific job requirements. The practice heretofore has been for the contractor to furnish meticulously detailed plans for the glass installation so that the various lengths and types of pipes specifically called for by the plans could be procured from a glass fabricator and then transferred to the job site in carefully labelled boxes.

With existing procedures, the use of glass in place of standard plumbing materials, such as copper tubing or galvanized pipe, while advantageous in many respects, has certain practical drawbacks which to a degree militate against the commercial choice of glass rather than less desirable materials. When using ordinary plumbing materials, one may produce special pipe lengths as required on the job site without difficulty, but heretofore this could not be accomplished when using glass. As a consequence, the building contractor has had to rely on the very careful ordering of the exact glass materials needed. In the event the contractor is in error in his order, or should he inadvertently break a special length of glass tubing, he is likely to encounter a long delay before a replacement can be obtained. Delays of this type may hold up the completion of the structure, and hence may be very costly.

One solution to the problem of installing glass tubing is to supply the mechanical contractor with a standard glass-working lathe on the job site. However, this solution leaves much to be desired, for trained and highly paid personnel are required to operate such lathes. Skilled glass-working operators are usually not available to a building contractor. Furthermore, the use of standard glass-working lathes on the job site introduces other inconveniences, for the very nature of the lathe is such that workpieces cannot easily be inserted therein or removed after the work is completed. The reason for this is that standard lathes include precision headstock and tailstock collets which require careful manipulation.

Accordingly, it is the main object of this invention to provide a glass-working lathe for the field fabrication of glass pipe, drain line, and other forms of tubing, the lathe requiring relatively little skill to operate.

A significant feature of the invention is that lathe manipulations may be performed by unskilled or semi-skilled workers. In fact, it has been found possible to train unskilled workers having but a fair degree of mechanical aptitude to make precision seals on the lathe after only ten to fifteen minutes of instruction. The seals produced by such workers were found to be equivalent to those produced by expert glass workers having many years of experience.

More specifically, it is an object of the invention to provide a glass-working lathe which does away with chucks and collets, the glass to be worked being held therein between lower sets of idler rollers and synchronized and coordinated upper drive wheels. A salient advantage of the invention is that individual pieces of glass pipe may be inserted or removed simply by raising or lowering the synchronized drive wheels by means of an automatic locking lever.

Also an object of the invention is to provide a portable glass-working lathe of the above-described type which is readily transported from one job site to another, or which may be placed in a fixed installation.

Briefly stated, these objects are accomplished in a glass-working lathe wherein a carriage is provided which is shiftable along a ways mounted on a bedplate, the carriage being linked to a pivotally-supported arm at the end of which a first drive wheel is rotatably mounted, which arm, when brought down from an elevated position causes the first drive wheel to engage a circumferential portion of a tubular glass workpiece resting within a V-shaped recess defined by a first set of idler rollers supported by a cantilever beam extending from the carriage, whereby movement of the carriage causes a corresponding shift both in the position of the first drive wheel and the first set of idler rollers.

The carriage is movable along the ways with respect to a second pivotally-supported arm at the end of which a second drive wheel is rotatably mounted, the two arms being operatively linked for simultaneous pivotal movement and being provided with means to rotate the two drive wheels concurrently, the second drive wheel, when the second arm is brought down, engaging another circumferential portion of the workpiece resting within a V-shaped recess defined by a second set of idler rollers mounted at a fixed position above the bedplate, whereby the workpiece is clamped and is caused to rotate between the two sets of idler rollers and the two drive wheels, the relative position of the two drive wheels to their associated idler rollers being maintained regardless of the carriage position.

For a better understanding of the invention, as well as other objects and further features thereof, reference is made to the following description to be read in conjunction with the accompanying drawings, wherein:

FIG. 2 is a perspective view of the same lathe looking directly at the front thereof;

FIG. 3 is an enlarged perspective view showing a portion of the lathe, with the drive-wheel arms lowered into engagement with a glass workpiece;

FIG. 4 is a plan view, partly in section, showing the details of the drive-wheel arms and the operating mechanism therefor;

FIG. 5 is an end view of the lathe; and

FIG. 6 is a view, partially in section, showing a scoring tool usable in conjunction with the lathe.

Figure 1:
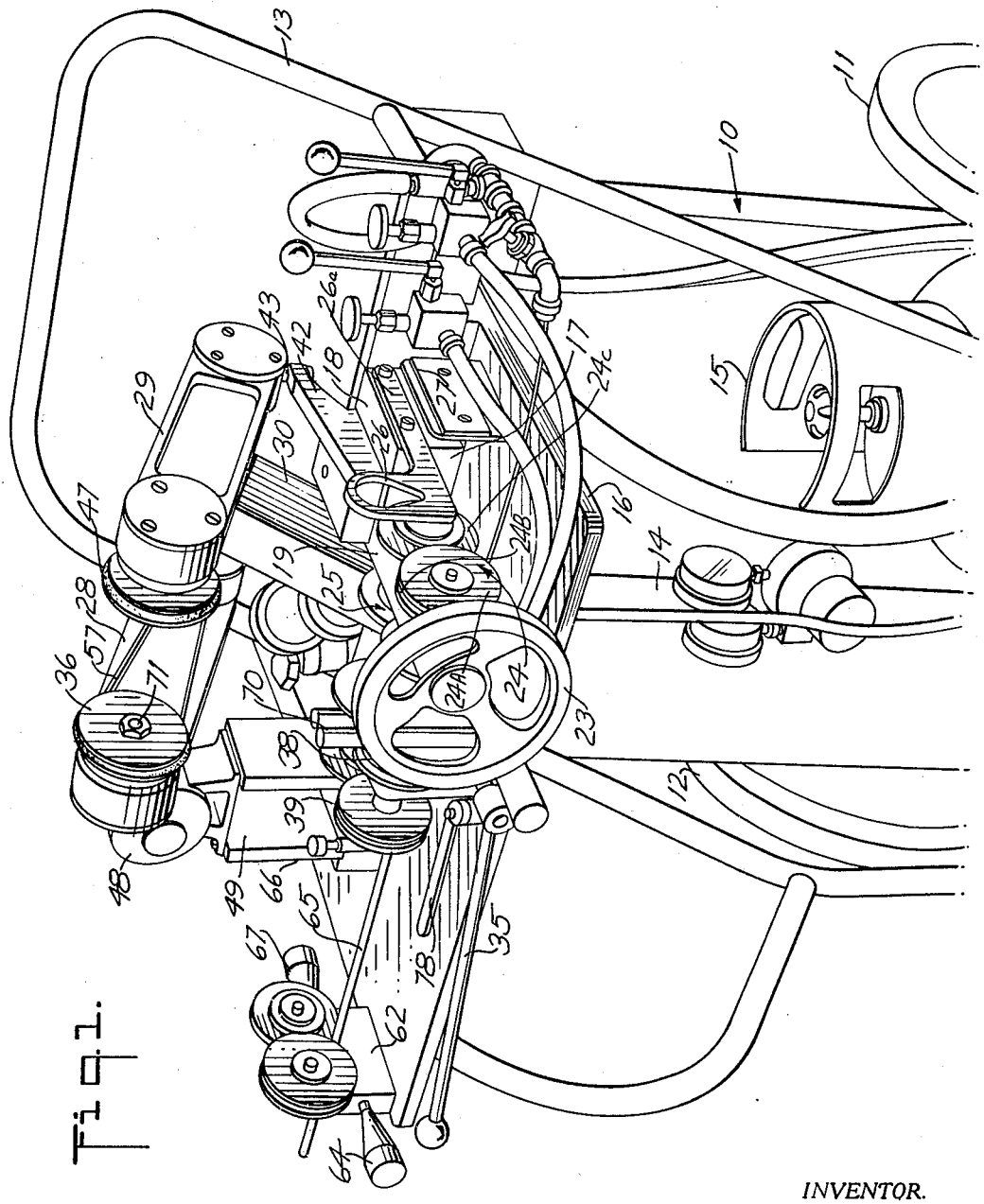
FIG. 1 is a perspective view of a glass-working lathe in accordance with the invention, the view being taken at an angle to the lathe, the drive-wheel arms being elevated.

Referring now to the drawing, and more particularly to FIGS. 1 and 2, there is shown a glass-working lathe in accordance with the invention, the lathe being mounted on a portable stand 10, provided with a pair of wheels 11 and 12 as well as a handle 13. Placed on the stand below the lathe are an oxygen tank 14 and a propane gas tank 15 to supply gas to the burners or torches. Because of this arrangement, the lathe and its gas supply may be easily transported to a job site. Alternatively, in a stationary installation, the lathe may be mounted on a sturdy work bench.

The glass-working lathe includes a rectangular bedplate 16 on which is mounted a longitudinally-extending ways 17, a carriage 18 being shiftable therealong. Projecting laterally from carriage 18 is a cantilever beam 19, within which, as best seen in FIG. 4, is a shaft 20 terminating in a pinion 21, meshing with a rack 22 running along the ways. Shaft 20 is turned by a manually-operated wheel 23 disposed at the front end of the beam. Thus, depending on the direction of wheel rotation, the carriage is caused to shift to the left or right on the ways.

Rotatably mounted on opposing sides of cantilever beam 19, are two sets 24 and 25 of idler rollers. Each set, as exemplified by set 24, is composed of a pair of rollers 24A and 24B which are spaced apart on a common axle, a third roller 24C of the same dimensions being mounted on a parallel axle and being inserted in the space between rollers 24A and 24B to define a V-shaped recess for accommodating tubular glass workpieces W of different diameter. A guide plate 26 is affixed to the end of carriage 18 by means of an extension arm 26a, the guide plate serving as an end limit for the glass piece W supported on the idler rollers and having a tear-shaped opening through which glass-working tools may be introduced into the workpiece. Movement of the carriage toward the right is limited by a bumper 27 secured to the end of the ways 17.

Two arms 28 and 29 are pivotally supported above the bed of the machine by means of an inclined beam 30. As best seen in FIG. 4, one end of arm 28 is secured to a sleeve 31 which telescopes within a circular opening extending transversely through the top of the beam. Connected to a point on the exterior of sleeve 31 is one end of a cable 32, the other end of which, as best seen in FIGS. 2 and 5, is wound about a reel 33 keyed to a shaft 34. This shaft is rotated by means of a hand-operated lever 35 at the front of the machine, such that when the lever is raised, the cable winds about the reel to cause sleeve 31 to rotate, thereby causing arm 28 to swing from its normally elevated position to a lowered position in which a rubber-rimmed drive wheel 36, rotatably mounted at the free end of arm 28, engages the surface of workpiece W. The lever is automatically held in its raised position by a suitable detent, operated by a latch 78 to release the detent when it is desired to lower the lever and thereby raise the drive wheels.

Mounted on either side of a standard 37 affixed to the bedplate 16 are two sets of idler rollers 38 and 39, these sets also being composed of three rollers defining V-shaped recesses for accommodating the workpiece. The position of drive wheel 36 is centered with respect to the two sets of idler rollers therebelow. Thus the drive wheel is symmetrically disposed with respect to the idler rollers and engages a circumferential portion of the workpiece.

Arm 29 is affixed to a headpiece 40 having a tubular extension 41 which is telescopically received within sleeve 31. Attached to carriage 18 and extending laterally therefrom is a pusher plate 42 provided at its extremity with a lug 43 which enters a slot 29a at the underside of arm 29, such that this arm is forced to travel with the carriage, the tubular extension 41 at the same time sliding in and out of sleeve 31.

In order to cause arms 28 and 29 to swing together, regardless of their relative spacing, sleeve 31 to which arm 28 is attached, is linked to head 40 to which arm 29 is attached, by means of a pin 44 which projects from an endplate 45 on sleeve 31 and which enters a bore in an endplate 46 on head 40. Thus when sleeve 31 is rotated by raising the lever, the head 40 is simultaneously rotated, causing a concurrent swing of the arms.

Rotatably mounted on arm 29 is a rubber-rimmed drive wheel 47 which is centered with respect to the two sets of idler rollers 24 and 25 therebelow. Since movement of carriage 18 causes drive wheel 47 on arm 29 and the two sets of idler rollers on beam 19 to shift simultaneously, their relative positions are maintained regardless of the carriage position. Drive wheel 47 engages a circumferential portion of the workpiece and is symmetrically disposed with respect to the idler rollers therebelow.

In order to operate drive wheels 36 and 47 simultaneously, a motor 48 is provided which is mounted above the bed on a pedestal 49. The output axle of the motor is coupled through a suitable coupling 50 to a shift 51 extending through a bearing 52 at the end of arm 28 and entering one end of a coupling tube 53, disposed concentrically within tubular extension 41. A shaft 54, which is supported in a bearing 55 at the end of arm 29, extends into the other end of coupling tube 53, shafts 51 and 54 being splined to this tube, whereby they are free only to move axially, whereby the two shafts remain operatively coupled to each other as the carriage 18 and arm 29 coupled thereto shift in position relative to arm 28.

Drive wheel 36 is provided with a pulley 56 linked by a continuous belt 57 to a pulley 58 mounted on shaft 51, while drive wheel 47 is similarly provided with a pulley 59 linked by a continuous belt 60 to a pulley 61 on shaft 54. Thus both drive wheels rotate concurrently and at the same speed regardless of the relative positions of their supporting arms.

Mounted on a standard 62 at the left edge of the bedplate is a fifth set 63 of idler rollers, the angular position of the standard being adjustable, the adjusted position being held by a set-screw knob 64. When these idler rollers are at an angle to the other sets thereof, and a glass tubing rests thereon, it produces a screw action causing the tube to shift axially at a rate determined by the angle of the idler rollers. This axial movement is desirable in certain glass-working operations.

Also supported on standard 62 is an extension rod 65 having a right-angle bend at one end on which there is supported a single guide roller 66 which is adapted to engage the rim of a glass workpiece supported on the idler roller sets 24, 25 and 38, 39. The position of this rod is adjusted in accordance with the length of the workpiece held in the machine, and is maintained by a set-screw knob 67. In the position shown, roller 66 is adapted to engage a short workpiece not extending as far as the fifth set 63 of idler rollers. But, for long pieces the rod may be made to extend outwardly from standard 62 by rotating the standard and the rollers thereon so that now roller 66 can engage the rim of a workpiece resting on the fifth set.

The gas lines from the gas tanks are coupled through control valves 68 and 69 to a double torch or burner 70 resting on the bedplate between the idler roller sets 24, 25 and 38, 39. In practice, these valves may be solenoid-actuated and controlled by a foot switch to allow an operator to change the intensity of the flame from a pre-set sealing level to a second pre-set, annealing level. The torch 70 is secured to a pantograph (not shown) movable by a handle 70a (FIG. 2) making it possible to shift the position of the torch along the workpiece.

To facilitate scribing or scoring operations, the hubs of drive wheels 36 and 47 are provided with socket members 71 and 72, respectively, which are adapted to receive a scoring tool of the type shown separately in FIG. 6. This tool is constituted by a spring-biased scoring implement 73, preferably having a diamond tip, which is retractable within socket 74 having a handle 75, the socket having opposing pointers 76 and 77 extending laterally therefrom, which are receivable within the centers of sockets 71 and 72, as shown in FIG. 3. To place the tool within these sockets, one has merely to shift the carriage to a position in which the drive wheels are properly spaced to receive the pointers. Thus workpieces of different size may readily be introduced into the machine and removed therefrom without the need for precision collets, and various glass-working operations, such as beading, scoring, sealing, etc., may be carried out with a minimum of glass-working skill.

What we claim is:
1. A glass-working lathe for operating on a tubular glass workpiece, comprising:
   (a) a bedplate having a ways thereon;
   (b) a carriage shiftable along said ways and having a cantilever beam extending laterally therefrom;
   (c) first and second sets of idler rollers mounted on either idler side of said beam, each set being constituted by a pair of spaced rollers rotatable on a common axis and a third roller rotatable on a parallel axis and inserted between said pair thereof to define a V-shaped recess;
   (d) a first pivotally-mounted arm extending transversely with respect to said ways and having a drive wheel rotatably supported at the end thereof and adapted to engage and drive said workpiece, said wheel being centered with respect to said first and second sets, said arm being linked to said carriage to move therewith;
   (e) a second pivotally-mounted arm supported from a fixed position on said bed in parallel relation to said first arm and having a second drive wheel rotatably mounted at the end thereof and adapted to engage and drive said workpiece;
   (f) third and fourth sets of idler rollers mounted above said bed at a fixed position, said sets defining V-shaped recesses and being disposed symmetrically with respect to said second wheel, said workpiece lying in the V-shaped recesses of said first, second, third and fourth sets of idler rollers;
   (g) means simultaneously to cause said arms to shift from an elevated to a lowered position to cause said wheels to engage the surface of said tubular workpiece resting on said idler rollers whereby the workpiece is clamped and is caused to rotate between the sets of idler rollers and the two drive wheels, the position of the two drive wheels relative to the idler rollers associated therewith being maintained regardless of the position to which the carriage is shifted;
   (h) means simultaneously to rotate said drive wheels; and
   (i) tool means pivotally connected between said first and second drive wheels to operate on said workpiece.

2. A lathe as set forth in claim 1, further including a fifth set of idler rollers disposed on said bed at a position spaced from said third and fourth sets and being angularly adjustable to produce a screw action on said workpiece to cause axial movement thereof.

3. A lathe as set forth in claim 1, further including bearings on the hubs of said drive wheels to support a glass scoring tool.

4. A lathe as set forth in claim 1, wherein said second arm is secured to a sleeve telescopically received in a transverse opening at the top of a beam extending upwardly from the bedplate, said sleeve having one end of a cable connected to the exterior thereof, the other end of said cable being wound about a reel turned by a lever, such that when the lever is raised, the arm is brought down.

5. A lathe as set forth in claim 4, wherein said first arm is mounted on a head having a tubular extension telescoping within said sleeve, said sleeve and said head being linked, whereby when said second arm is lowered said first arm is simultaneously lowered.

6. A lathe as set forth in claim 5, wherein said means simultaneously to rotate said drive wheels includes a coupling tube concentrically disposed within said tubular extension, a motor shaft extending transversely through the second arm into one end of said tube and having a pulley thereon, a belt linking said pulley to a pulley secured to said second drive wheel, a shaft extending from the first arm into the other end of said tube and having a pulley thereon linked by a belt to a pulley on said first drive wheel, said two shafts being splined to said tube and being free only to shift axially.

References Cited
UNITED STATES PATENTS

| 1,664,154 | 3/1928 | Broche | 65—174 |
| 2,304,714 | 12/1942 | Stringer | 65—174 XR |
| 2,534,547 | 12/1950 | Eisler | 65—174 XR |
| 2,835,079 | 5/1958 | Camarata et al. | 65—272 XR |
| 3,186,819 | 6/1965 | Thorington et al. | 65—109 XR |
| 3,309,188 | 3/1967 | Porter et al. | 65—109 |
| 2,059,474 | 11/1936 | Meyer | 65—278 XR |
| 1,489,836 | 4/1924 | King | 65—279 XR |

FRANK W. MIGA, Primary Examiner

U.S. Cl. X.R.
65—112, 272, 278, 297